United States Patent [19]
Tsuo et al.

[11] Patent Number: 6,103,942
[45] Date of Patent: Aug. 15, 2000

[54] METHOD OF HIGH PURITY SILANE PREPARATION

[75] Inventors: Y. Simon Tsuo, Golden, Colo.; Eugene P. Belov, Moscow, Russian Federation; Vadim G. Gerlivanov, Moscow, Russian Federation; Vitali V. Zadde, Moscow, Russian Federation; Solomonida I. Kleschevnikova, Moscow, Russian Federation; Nikolai N. Korneev, Moscow, Russian Federation; Eugene N. Lebedev, Moscow, Russian Federation; Akhsarbek B. Pinov, Moscow, Russian Federation; Eugene A. Ryabenko, Moscow, Russian Federation; Dmitry S. Strebkov, Moscow, Russian Federation; Eugene A. Chernyshev, Moscow, Russian Federation

[73] Assignee: Midwest Research Institute, Kansas City, Mo.

[21] Appl. No.: 09/288,005

[22] Filed: Apr. 8, 1999

[51] Int. Cl.$^7$ .............................. C07C 29/12; C01B 33/12
[52] U.S. Cl. .......................... 568/888; 568/890; 423/335; 423/339
[58] Field of Search ................................ 568/888, 890; 423/335, 339

[56] References Cited

U.S. PATENT DOCUMENTS

| | | | |
|---|---|---|---|
| 3,979,465 | 9/1976 | Strehlke et al. | 568/888 |
| 4,395,389 | 7/1983 | Seth . | |
| 5,260,471 | 11/1993 | Yamada et al. . | |
| 5,362,897 | 11/1994 | Harada et al. . | |
| 5,478,546 | 12/1995 | Matsumura et al. | 423/335 |
| 5,597,512 | 1/1997 | Watanabe et al. | 252/315.6 |
| 5,911,658 | 6/1999 | Yoldas | 516/101 |
| 5,935,543 | 8/1999 | Boyer et al. | 423/339 |

FOREIGN PATENT DOCUMENTS

| | | |
|---|---|---|
| 0201919 | 11/1986 | European Pat. Off. . |
| 3311650 | 10/1983 | Germany . |
| 7427517 | 7/1984 | Japan . |
| 327781 | 10/1976 | U.S.S.R. . |
| 1365616 | 9/1974 | United Kingdom . |

OTHER PUBLICATIONS

Certain Improvements in the Techinque of Preparaion of Pure Silicon by Thermal Deposition of Silane, Soviet Journal of Solid State Physics (Russian Orginial vol. 1. No. 6) Dec. 1959, pp. 914–916.

Preparation and Study of Dielectric Properties of a Group–of–Glass with Increased Permittivity, Soviet Journal of Technical Physics, Dec. 1957, V. 27, No. 8, pp. 1645–1648.

"Manufacture of a Clean Silicon by the Thermal Decomposition of Silane," Soviet Journal of Technical Physics, 1987, V. 27, No. 8, pp. 1645–1648.

Primary Examiner—Paul F. Shaver
Attorney, Agent, or Firm—Ken Richardson

[57] ABSTRACT

A process for the preparation of high purity silane, suitable for forming thin layer silicon structures in various semiconductor devices and high purity poly- and single crystal silicon for a variety of applications, is provided. Synthesis of high-purity silane starts with a temperature assisted reaction of metallurgical silicon with alcohol in the presence of a catalyst. Alcoxysilanes formed in the silicon-alcohol reaction are separated from other products and purified. Simultaneous reduction and oxidation of alcoxysilanes produces gaseous silane and liquid secondary products, including, active part of a catalyst, tetra-alcoxysilanes, and impurity compounds having silicon-hydrogen bonds. Silane is purified by an impurity adsorption technique. Unreacted alcohol is extracted and returned to the reaction with silicon. Concentrated mixture of alcoxysilanes undergoes simultaneous oxidation and reduction in the presence of a catalyst at the temperature −20° C. to +40° C. during 1 to 50 hours. Tetra-alcoxysilane extracted from liquid products of simultaneous oxidation and reduction reaction is directed to a complete hydrolysis. Complete hydrolysis of tetra-alcoxysilane results in formation of industrial silica sol and alcohol. Alcohol is dehydrated by tetra-alcoxysilane and returned to the reaction with silicon.

6 Claims, 1 Drawing Sheet

| Type of alcohol | Simultaneous reduction and oxidation of alcoxysilanes | | | | Absorbtion of impurities from silane | | | | | Resistivity of single crystal Si | | Amount of alcohol reused as a percent of alcohol used in reaction with Si (%) |
|---|---|---|---|---|---|---|---|---|---|---|---|---|
| | Catalyst | Temperature (°C) | Duration (hours) | Conversion (%) | Absorber | Initial temperature of absorber (°C) | Contact duration (minutes) | Organoelemental compounds content v% | | After 1 treatment by zone melting (Ω*cm) | After 7 treatments by zone melting (Ω*cm) | |
| Ethanol | Solution of sodium trialcoxysilanolate in tetraethoxysilane | 20 | 20 | 98.5 | Tetraethoxy silane | -80 | 30 | 0.001 | | 900 | 28000 | 96 |
| Ethanol | Solution of sodium ethylate in tetraethoxysilane | -20 | 50 | 98.0 | Tetraethoxy silane | -80 | 60 | 0.001 | | 850 | 35000 | 97 |
| Ethanol | Solution of sodium ethylate in tetraethoxysilane | 40 | 1 | 97.0 | Tetraethoxy silane | -80 | 5 | 0.003 | | 800 | 25000 | 96.5 |
| Methanol | Solution of sodium ethylate in tetraethoxysilane | 20 | 20 | 98.3 | Tetraethoxy silane | -80 | 30 | 0.002 | | 950 | 33000 | 95 |

Figure 1

METHOD OF HIGH PURITY SILANE PREPARATION

CONTRACTUAL ORIGIN OF THE INVENTION

The United States Government has rights in this invention pursuant to Contract No. DE-AC36-98GO10337 between the United States Department of Energy and the National Renewable Energy Laboratory, a division of Midwest Research Institute.

BACKGROUND OF THE INVENTION:

1. Field of the Invention.

The present invention relates to a process for the preparation of high purity silane suitable for forming thin semiconductor and dielectric layers, and also high purity poly- and single crystal silicon, for a variety of applications, such as electronics and solar energy.

2. Description of the Prior Art

Thermal decomposition of silane is the most favorable of all known techniques for high purity silicon preparation even when compared to the currently most common method of hydrogen reduction of trichlorosilane. Arguments in favor of the thermal decomposition technique include: (1) thermal decomposition proceeds at a temperature of about 850° C., instead of 1100° C., and is, therefore, less energy consuming; (2) products of the reaction do not contain hydrogen chloride, chlorosilanes, and other reactive compounds which reduce the purity of the silicon produced; (3) significant differences in physical and chemical properties of silane and impurity compounds allow for a more effective separation of silane from the majority of undesirable impurities; and (4) not only silicon, but silane, and its gaseous mixtures, are also industrial products that are needed for the production of thin-film semiconductor devices. The majority of the processes for silicon preparation from silane are complicated and more expensive than the trichlorosilane reduction method. For that reason, silane is used only for highest purity polysilicon that is transformed into single crystal silicon by float-zone melting. This single crystal silicon is used in infrared receivers and nuclear radiation detectors. In order to reduce the cost of silane and silicon, while maintaining high purity of the materials, scientists around the world are searching for new and more effective technologies for production of high-purity monosilane. A well-known technique for silane preparation is simultaneous reduction and oxidation of trichlorosilane (German Federal Republic Patent No. 3,311,650, published on Oct. 13, 1983). The first step of the process is catalytic hydrogenation of metallurgical silicon:

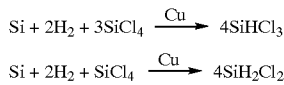

The process proceeds at 400–600° C. in the pressure range from 0.7 to 41.4 bar. It is followed by di- and trichlorosilane extraction. The second step is the simultaneous reduction and oxidation of chlorosilanes in the presence of a catalyst. The resulting reaction is:

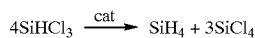

Anion-exchange tars with ternary amines are used as a catalyst. The reduction-oxidation reaction is carried out at temperatures up to 150° C. It is followed by silane purification. In this method, secondary hydrogenation is carried out on silicon tetrachloride, that is created as a byproduct when monosilane is obtained by simultaneous oxidation and reduction of chlorosilanes, which allows high efficiency in the consumption of raw metallurgical silicon and significantly reduces the cost of monosilane and polycrystalline silicon. This method, however, has several significant disadvantages. First, it requires special equipment designed to withstand the high temperature, and high pressures of the silicon tetrachloride hydrogenation process. Second, it has aggressive chlorine compounds that carry impurities from the walls of the reactor into monosilane. Third, difficulties associated with the purification of silane, up to high-purity grade, are encountered. Finally, ecologically unsafe chlorine compounds are involved in the process.

The basics of simultaneous catalytic oxidation and reduction of alcoxysilane, in particular of the triethoxysilane, were developed in the USSR, in 1957–1959 (*Soviet Journal of Technical Physics*, 1957, v. 27, No. 8, pp. 1645–1648, *Soviet Journal of Solid State Physics*, 1959, v. 1, pp. 999–1001). Further development of this method, especially in obtaining alcoxysilane by direct reaction between metallurgic silicon and ethanol, is described in Japanese Patent No. 7,427,517, dated Jul. 18, 1974. We consider this patent to be a precursor of the current invention, and it is incorporated by reference herein.

According to this precursor technology, high purity silane synthesis starts with the reaction of metallurgical silicon with ethanol in the presence of a catalyst at elevated temperatures. Triethoxysilane, separated from the products of the reaction and purified, undergoes the simultaneous oxidation and reduction reaction in the presence of a catalyst. Silane formed in this reaction is separated from other products and is purified from the mixture by low temperature condensation and sorption on different adsorbents. This process is conducted in the following manner. The reaction of powdered silicon with ethanol proceeds at 190–200° C. The catalyst, in this reaction, is an element of Ib group of the Periodic Table (for example Cu or Ag). The medium, of the reaction, is a solvent with a high boiling temperature, such as hexaisopropoxysiloxane, with a boiling temperature of 280° C., or dodecaethoxypentasiloxane with boiling temperature 290–300° C. The reaction of silicon with ethanol proceeds according to the equation:

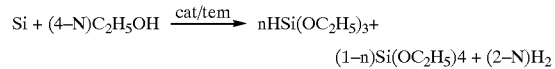

Ideally n equals 1 but it is usually less than 1. The reaction shifts toward one or another product depending on properties of the catalyst and the medium.

Triethoxysilane extracted from the products, of the reaction, is purified by multistage distillation. Then, it is subjected to the simultaneous reduction and oxidation reaction in the presence of a catalyst. The catalyst in this case comprises elements of groups Ia and IIa of the Periodic Table (Na, K, Ca, and etc.). Low temperature condensation and adsorption techniques are used to purify silane formed in the simultaneous oxidation and reduction reaction. The most effective adsorbents appear to be activated carbon, activated aluminosilicate, and silica gel.

Important problems related to purity of the produced silane and efficiency of the process had not been addressed in the precursor method, Japanese Patent No. 7,427,517. Solving these problems would allow reducing the cost of the products and would make them more competitive. For example, the amounts of dry ethanol used to produce silane (consumption coefficient of ethanol per unit of silane produced is 18–20) have a negative impact on the overall cost of the product. Another problem is a strict requirement to the allowed content of water in the alcohol (less than 500 ppm). Moreover, industrial alcohol contains up to 0.1% of water. Before it is used in the reaction with silicon, alcohol should go through an additional drying process where dehydrating agents, such as benzene (benzol), alkali metals, etc., are used. This additional dehydration step promotes contamination of alcohol and thus contamination of final products and by-products with impurities, and it increases the cost of alcohol.

Multistage distillation of the products of silicon-ethanol reaction (di-, tri-, tetraethoxysilane, unreacted alcohol etc.), in order to extract triethoxysilane, is energy consuming and, therefore, not efficient. Using alkali and alkali-earth metals as catalysts, for the simultaneous oxidation and reduction reaction, is also not efficient. Due to some secondary reactions, a layer of silicon forms on the surface of catalysts and deactivates them. Replacement of a catalyst during the reaction is a very dangerous operation. It also introduces a large amount of impurities into the process. Increasing temperature up to a point when it solves the problem of catalyst deactivation significantly increases the content of ethoxysilane vapors in the silane produced.

Another problem that has not been addressed in the precursor method is recycling of liquid secondary products, of the simultaneous oxidation and reduction reaction, which results in 25–30 times more liquid product than silane. This significantly increases consumption of raw material. Silane purification by low temperature condensation method is also not efficient because of the dispersed liquid phase that may form if the gas is overcooled. Purification of silane by impurity adsorption, when it contains more than one volume percent of vapors of organoelemental and silicon compounds, requires large quantities and frequent replacement of adsorbents.

It is therefor an object of the present invention to provide, in a method of high purity silane preparation, an increase in the output and purity of silane produced and, at the same time, reduce materials and energy consumption.

It is a further object of the present invention to increase the purity of produced silane through: (1) separation of unreacted dry alcohol from the products of silicon-alcohol reaction, at or near room temperature, and reusing alcohol in the process; (2) reusing the active part of a catalyst in simultaneous oxidation and reduction reaction of alcoxysilanes; (3) preliminary absorption purification of silane with cooled absorber followed by adsorption cleaning; and (4) return of dehydrated alcohol, resulting from complete hydrolysis of tetra-alcoxysilane subsequently purified, to react with silicon.

It is yet another object of the present invention to provide a method of high purity silane preparation which allows reduction of raw material consumption through: (1) return of alcohol, from all stages, to the beginning of the process; (2) reuse of the active catalyst portions; and (3) increase in the output of silane by reducing the amount of secondary products formed.

It is yet another object of the present invention to provide a method of high purity silane preparation which provides lower energy consumption through: (1) extracting unreacted alcohol from products of the reaction with silicon; (2) conducting simultaneous oxidation and reduction reaction in the presence of a catalyst in the continuous regime at or near room temperature; and (3) introducing the step of preliminary silane purification by absorption.

It is a further object of the present invention to provide a method of high purity silane preparation that is without wastes and it is ecologically safe.

These and other objects of the present invention will become apparent to one skilled in the art. All the foregoing objects provide a process which is economically effective and one which reduces the cost of silane. Polysilicon made from such silane is of sufficient quality that it is suitable for a whole range of semiconductor devices, including photovoltaic solar cells. Thus, the combination of the proposed processes and optimized regimes for high purity silane preparation provides the solution to the aforementioned problems.

SUMMARY

The present invention provides the preparation of high purity silane. The high purity saline made according to the invention herein is suitable for forming thin layer silicon structures, in various semiconductor devices, and high purity poly- and single crystal silicon for a variety of applications (semiconductor devices, solar energy conversion). The method provides high purity and output of silane yet reduces consumption of energy and raw materials. The process comprises a temperature assisted reaction of metallurgical silicon with alcohol in the presence of a catalyst. Alcoxysilanes formed in the silicon-alcohol reaction are separated from other products and purified. Simultaneous reduction and oxidation of alcoxysilanes produces gaseous silane and liquid secondary products including the active part of a catalyst, tetra-alcoxysilanes, and impurity compounds with silicon-hydrogen bonds. Silane is purified by an impurity adsorption technique.

According to the invention, unreacted alcohol is extracted and returned to the reaction with silicon. A concentrated mixture of alcoxysilanes undergoes simultaneous oxidation and reduction in the presence of a catalyst at the temperature of −20° C. to +40° C. during 1 to 50 hours. Tetra-alcoxysilane, extracted from liquid products of simultaneous oxidation and reduction reaction, is directed to a complete hydrolysis. Complete hydrolysis of tetra-alcoxysilane results in formation of industrial silica sol and alcohol. Alcohol is dehydrated by tetra-alcoxysilane and returned to the reaction with silicon.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

DESCRIPTION OF THE DRAWINGS

FIG. 1., is a Table of the results of experiments 1–4.

DESCRIPTION OF THE PREFERRED EMBODIMENTS

According to the method of the invention, unreacted alcohol, in the reaction of metallurgical silicon with alcohol, is extracted and returned to react with silicon. A concentrated mixture of alcoxysilanes undergoes simultaneous oxidation and reduction in the presence of a catalyst at the temperature range from −20° C. to +40° C., for a time period of 1 to 50 hours. Silane, released in the simultaneous oxidation and reduction reaction, is purified by preliminary impurity absorption. Alcohol is added to the liquid products of the simultaneous oxidation and reduction reaction, and then the tetra-alcoxysilane is extracted from the mixture and subjected to complete hydrolysis. Complete hydrolysis of tetra-alcoxysilane results in formation of industrial silica powder and alcohol. Alcohol is dehydrated and returned to react with silicon.

The amount of alcohol added to the liquid secondary products of simultaneous oxidation and reduction reaction is sufficient to eliminate the presence of compounds with silicon-hydrogen bonds. Subsequently, tetra-alcoxysilane is extracted from the mixture and the remaining active part of a catalyst is returned to the simultaneous oxidation and reduction reaction.

Alcohol formed, in the process of complete hydrolysis of tetra-alcoxysilane, is dehydrated by tetra-alcoxysilane extracted from the liquid products of the simultaneous oxidation and reduction reaction. Tetra-alcoxysilane, first used in alcohol dehydration, is then sent to the complete hydrolysis.

Preliminary absorption of impurities from silane is carried out using an absorber cooled down to the temperature slightly above its freezing point. Sorption proceeds in the countercurrent regime with 5–60 minutes of contact time. The temperature difference between silane and adsorbent does not exceed 5° C.

Tetra-alcoxysilane, extracted from the liquid products of the simultaneous oxidation and reduction reaction, is used as an absorber in the silane purification process.

The process of the invention comprises the following steps. The first step in synthesizing high purity monosilane is the reaction of metallurgic silicon with alcohol (preferably ethanol) in the presence of a catalyst at elevated temperatures, with the formation of alcoxisilanes, from which the final product is trialcoxysilane. This process may proceed according to one of the two known techniques (in the gas phase, U.S. Pat. No. 5,260,471; or in the high-boiling solvent medium, U.S. Pat. No. 5,362,897). These disclosures are incorporated herein by reference.

In the first technique, the interaction of fluidized metallurgic silicon and alcohol proceeds in the gaseous phase and in the presence of halide catalyst such as methyl or ethyl chloride. Lowering the pressure below atmospheric allows reducing the temperature of the process and improving output of the main targeted product of the reaction, trialcoxysilane, by eliminating condensation of high-boiling compounds on silicon particles and walls of the reactor. A high degree of metallurgic silicon conversion is thereby achieved in this method. It also provides a high yield trialcoxysilane formation.

In the second technique, the reaction of metallurgic silicon with alcohol proceeds in a high-boiling solvent medium in the presence of a catalyst containing compounds of copper (acetate, oxalate or chloride) with the addition of aluminum or an aluminum-silicon alloy. A high degree of metallurgic silicon conversion (up to 99.8%) is achieved in this method, which simplifies the process of solid precipitate separation from a high-boiling solvent. After separation of precipitates, the solvent is recycled. Condensed products of the reaction of metallurgic silicon with alcohol include about 50% of trialcoxysilane, 10% of tetra-alcoxysilane, 25% of unreacted alcohol, up to 3% of diethoxysilane, up to 1% of chlorine compounds etc. for both techniques described above.

It is well known that the silicon-hydrogen bond is unstable, especially in an acidic medium. An alcoxy group may be easily substituted for hydrogen according to the reaction, where R is alkyl:

$$SiH(OR)_3 + ROH \rightarrow Si(OR)_4 + H_2$$

To prevent this from occurring, in the first stage of purification of the condensed products, the alcohol is removed. A rectification process is used for alcohol separation by lowering the pressures to around 100 mm·Hg, which allows for separation of the alcohol, at or near room temperature, and practically avoids breaking up of the silicon-hydrogen bonds. The extracted alcohol does not contain water. Small amounts of alcoxysilanes and volatile chlorine compounds do not prevent reusing the alcohol in the reaction with silicon to obtain alcoxysilanes. Further purification of alcoxysilane proceeds according to a known technique. (See below.)

If chlorine compounds are present in the reaction of silicon with alcohol, the condensed products of the reaction contain chloroethers with impurities of dissolved HCl, solid aluminum chloride, and other impurities of a similar composition. The most likely chloroether to form is monochlortriethoxysilane, $ClSi(OR)_3$. Treating this mixture with ammonia gas produces solid compounds according to the following reactions:

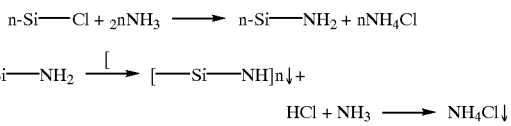

As a result of these reactions, chlorine compounds settle out as a small-particle solid precipitate having a large surface area that serve as an adsorbent for metal impurities, etc. The mixture of alcoxysilanes and solid precipitates (deposits) is separated (usually by filtration). Solid precipitates are used as an nitrogen-containing additive for biochemical wastewater purification. The concentration of impurities in alcoxysilane mixture after the separation from solid precipitates is represented in Table 1.

TABLE 1

| | Impurity content in alcoxysilane mixture. | | | | | | | | | | |
|---|---|---|---|---|---|---|---|---|---|---|---|
| Element | B | Fe | Mg | Al | Ca | Ti | Cu | As | Sb | Mo | P |
| Content (W %) | $1*10^{-6}$ | $5*10^{-6}$ | $5*10^{-6}$ | $5*10^{-6}$ | $7*10^{-6}$ | $5*10^{-6}$ | $3*10^{-6}$ | $1*10^{-5}$ | $1*10^{-6}$ | $5*10^{-6}$ | $1*10-5$ |

The proposed technique for separation and purification of alcoxysilanes from condensation products of reaction of metallurgical silicon with alcohol, has several advantages. The suggested method of alcohol extraction from the condensed products is the least energy It also allows a lower temperature process to be used and practically eliminates the break-up of silicon-hydrogen bonds in di- and trialcoxysilane, consuming. It also allows a lower temperature process to be used and practically eliminates the break-up of silicon-hydrogen bonds in di- and trialcoxysilane. That makes the output of silane, produced in the simultaneous oxidation and reduction reaction higher than, for example, in the precursor method where the alcohol is separated by a multi-distillation process. Tetra-alcoxysilane, with di- and trialcoxysilanes extracted, does not affect the simultaneous oxidation and reduction process and will be utilized according to the method, as described below. Suggested ammonia purification of alcoxysilanes is technologically simple and yields products practically free from impurities. Almost no wastes are associated with the process.

The mixture of purified di-, tri- and tetra-alcoxysilanes goes into the catalytic simultaneous oxidation and reduction process, which proceeds according to the reactions:

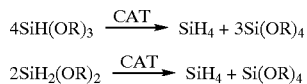

Solutions of alcoholates, alkaline trialcoxysilanes, alkaline-earth metals and aluminum in tetra-alcoxysilane are used as a catalyst in this reaction. The flow of alcoxysilanes and catalyst into the simultaneous reduction-oxidation reactor may be "batch" or, preferably, continuous with proportions of 20:1–10:1. As pointed out above, using alkaline and alkaline-earth catalysts for the simultaneous oxidation and reduction reaction is not efficient because of the deposition of silicon on the surface of a catalyst which blocks contact between alcoxysilanes and the catalyst, thus, deactivating it. This is a result of secondary reactions, the most likely of which is:

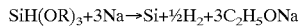

The separated silane is saturated by alcoxysilane vapors and as the temperature of the reaction is increased, the concentration of alcoxylane vapors increases. Therefore, the reaction is carried out at lower temperatures in the range of −20° C. to +40° C. Working at room temperature is preferred because it simplifies the design of the reactor and does not require using a cooling agent.

The most important characteristic of the simultaneous oxidation and reduction process is the conversion of alcoxysilanes with silicon-hydrogen bonds into silane. Along with some other processing conditions, duration of the reaction has a big impact on the conversion. In the continuous flow regime, time of the reaction should be in the 1–50 hour interval, preferably 10–25 hours. Taking into account silane's explosiveness and combustibility, and to minimize contamination of silane with impurities, the simultaneous oxidation and reduction reaction is carried out in a hermetic reactor which does not need mixers driven by external motors. Conversion of alcoxysilanes reaches 98% when suggested processing regimes are used.

It is important to note that the simultaneous oxidation and reduction of alcoxysilanes with silicon-hydrogen bonds is a selective process. Most undesirable impurities in silicon semiconductors are the elements of the third and fifth group of the Periodic Table, so called acceptors (boron etc.) and donors (phosphorus, arsenic etc.), respectively. None of the organic compounds of these elements have element-hydrogen bonds ($B(OR)_3$, $P(OR)_3$, $As(OR)_3$ etc.) and, therefore, they are not capable of simultaneous oxidation and reduction resulting in the formation of volatile hydrides (diborane, arsine, phosphine etc.). That simplifies the task of purification of silane from these undesirable impurities. The only way that these impurity elements may contaminate silane is through vapors of organoelemental compounds, examples of which were presented above.

The proposed invention for silane purification is aimed at providing the most effective process of separation of organoelemental and organic impurities. When the simultaneous oxidation and reduction reaction proceeds without cooling, heat released in the reaction may increase the temperature only slightly. The real temperature of the reaction is 30–40° C. At that temperature, the concentration of saturated vapors of organosilicon compounds is 1–2 v%. Preliminary absorption is proposed to purify silane from significant concentrations of organoelemental compounds.

All organoelemental compounds are totally soluble in tetraethoxysilane. Therefore, when cooled, tetraethoxysilane is used as an absorber. It is possible to reduce concentration of the impurity compounds in silane down to the value corresponding to their saturated vapor pressure at the temperature of the absorber. This purification process requires sufficient contact time between silane and the absorber, and a small difference in the temperature of silane and absorber at each point of their contact, which eliminates the formation of a dispersed liquid phase (volume vapor condensation of impurity compounds).

In a real absorption process, tetra-alcoxysilane, preferably tetraethoxysilane that is cooled down to the temperature slightly higher than its freezing point, is used as an absorber. Absorption proceeds in the countercurrent regime within 5–60 minutes of contact time. The temperature difference between silane and the absorber does not exceed 5° C., and is preferably at 2° C. By using these processing conditions, the concentration of organoelemental impurities in monosilane may be reduced to 0.001 v%.

Adsorption on activated carbon, at the room temperature and atmospheric pressure, is used to further purify silane. The concentration of organoelemental compounds may be easily reduced from 0.001 v% down to 0,00001–0.00005 v% by using just a single-stage adsorber filled with activated carbon.

The resulting high purity silane may be used in the gas phase at 100% concentration, or in the form of gaseous mixtures for forming thin-layer semiconductor structures, including most critical parts of integrated circuits.

High purity polysilicon produced from high purity silane by thermal decomposition is suitable for many different applications in electronics. Polysilicon formed from silane thermally by decomposition on electrically heated cylinder substrates, is extremely pure. By using the float-zone melting and crystallization technique, this high purity polysilicon may be transformed into single crystal silicon, which is used in infrared receivers and nuclear radiation detectors.

Solar grade silicon may be produced by thermal decomposition using more effective and less energy consuming apparatus such as a reactor with fluidized layer of seed silicon particles. The low cost of such silicon makes it practical to use it in photovoltaic solar cell production.

Liquid products of simultaneous oxidation and reduction of alcoxysilane include tetra-alcoxysilane, active part of a catalyst (solution of alcoholates or trialcoxysilanolates), and residue of unreacted alcoxysilanes with silicon-hydrogen bonds. The first stage in the treatment of these products is alcoxysilation of silicon-hydrogen bonds in unreacted alcoxysilanes:

$$SiH(OR)_3 + ROH \rightarrow Si(OR)_4 + H_2$$

For this process to occur, a sufficient amount of alcohol is added to the mixture at 50° C. In the presence of a catalyst, the efficiency of alcoxysilation is close to 100%.

The second stage is a separation of tetra-alcoxysilane by rectification. It is carried out at 100 mm·Hg, which allows for reducing the temperature of the process down to 90° C. Separation of tetra-alcoxysilane proceeds until the required concentration of the catalyst, in tetra-alcoxysilane, is achieved. The active catalyst part, remaining after separation, is reused in the simultaneous oxidation and reduction reaction of alcoxysilanes. Extracted tetra-alcoxysilane with alcohol residues enters the upper part of a packed absorption-reaction column, for dehydration of alcohol, resulting in the complete hydrolysis of tetra-alcoxysilane.

After alcohol dehydration, partially hydrolyzed tetra-alcoxysilane, at a temperature of 90–100° C., is used to complete the hydrolysis and formation of a colloidal dispersion of silicon dioxide (silica sol), which is accompanied by desorption of alcohol. Silica sol is a valuable by-product for industrial application. Vapors of the desorbed alcohol enter the lower (bottom) part of the packed absorption-reaction column where, as a result of contact with tetra-alcoxysilane, there is absorption of water vapor and interaction to form products of the hydrolysis. Dehydrated alcohol is returned to the alcoxysilane input stage for reaction with metallurgic silicon. In this manner, the proposed technological process results in production of valuable by-product silica sol and allows for return of nearly all dehydrated alcohol for reaction with metallurgic silicon. As a result, the consumption of alcohol for silane production is lowered to 3% of demand.

All of this reduces the cost of high purity silane and makes it more competitive worldwide. In particular, using polysilicon, produced by thermal decomposition of silane, will contribute to further development of solar cells.

The technological process proposed is illustrated by the following examples.

EXAMPLE 1

Powder of metallurgic silicon with 98.2% silicon and dispersity, no more than 100 mesh, is mixed with copper chloride (5% of metallurgic silicon weight) and then thermally treated in a neutral atmosphere. The mixture is dispersed in dodecaethoxypentasiloxan. After addition of aluminum powder, it enters the reaction with dried ethanol at 200° C. Vapors of ethoxysilanes formed in the reaction and unreacted ethanol are condensed by cooling. Ethanol is separated and returned to the reaction with silicon.

The resulting mixture of ethoxysilanes contains 87 w% of triethoxysilane. It is purified using an ammonia treatment. Ammonia gas is bubbled through the mixture of ethoxysilanes. The solid deposits, formed in this process, are filtered away. Purified ethoxysilanes undergo a continuous, simultaneous oxidation and reduction reaction in the presence of a catalyst (a 1% solution of sodium trialcoxysilanolate in tetraethoxysilane). The weight ratio of catalyst to ethoxysilanes is 1:15. Temperature of the process is 20° C. Duration of the reaction is 20 hours. Under these conditions, the conversion of triethoxysilane is 98.5%.

Silane released in the simultaneous oxidation and reduction reaction is purified by absorption. Tetraethoxysilane, used as an absorber for organoelemental impurity compounds, is cooled down to −80° C. Countercurrent, of silane gas and cooled tetraethoxysilane, proceeds for 30 minutes in the continuous regime. The temperature of silane decreases from 20° C. down to −80° C., and the temperature of tetraethoxysilane increases from −80° C. up to 20° C. The temperature difference between silane and tetraethoxysilane does not exceed 5° C., at each point of their contact.

The concentration of organoelemental compounds in silane is monitored using chromatography, where a detected carbon content is referenced to the content of the methane. After absorption is complete, the concentration of organoelemental impurities in silane is less than 0.001 v%. Adsorption on activated carbon is the final purification step. The quality of silane produced is characterized by resistivity measured on poly- and single-crystalline silicon rods. Single-crystal silicon is made from polysilicon by float-zone melting and crystallization technique. The resistivity of single-crystal silicon in a float-zone technique depends on number of passes through the zone and, is 900 Ω·cm for one pass and 28000 Ω·cm for seven passes.

Liquid products of simultaneous oxidation and reduction reaction are mixed with ethanol to break-up the remaining silicon-hydrogen bonds in unreacted ethoxysilanes. The amount of ethanol used is 0.85% of the liquid products' weight. The tetra-alcoxysilane is then separated from the remaining liquid products. The process of separation continues until the active part of a catalyst reaches the desired concentration (1% solution of sodium thriethoxysilanate in tetraethoxysilane). The catalyst is then returned to the simultaneous oxidation and reduction reaction.

Extracted tetraethoxysilane, with residue of alcohol (0.43%), enters the upper part of a packed absorption-reaction column for dehydration of alcohol released in the complete hydrolysis of tetraethoxysilane. After that, partially hydrolyzed tetraethoxysilane goes through complete hydrolysis, at 95° C., and forms a colloidal dispersion of silicon dioxide, accompanied by desorption of ethanol. The produced colloidal dispersion of silica sol is directed to industrial use. Ethanol is sent to the lower part of the packed absorption-reaction column for dehydration and then returned to the reaction with silicon. The quantity of alcohol returned is 96% of that used initially. Conditions and results of this and other three experiments are presented in FIG. 1, as Table 2.

EXAMPLE 2

The process, in the second experiment is the same as in Example 1, except that a one percent solution of sodium ethylate in tetraethoxysilane is used as a catalyst in the simultaneous oxidation and reduction of triethoxysilane. The simultaneous oxidation and reduction reaction proceeds at −20° C. for 50 hours. The absorption of impurities from silane continues for 60 minutes. Conditions and results of the experiment are given in FIG. 1, as Table 2.

EXAMPLE 3

The third experiment differs from Examples 1 and 2 in that the simultaneous oxidation and reduction reaction proceeds at 40° C. and contact time is 1 hour. Absorption of impurities from silane by cooled tetraethoxysilane occurs during time of contact between silane and tetraethoxysilane over a period of 5 minutes. Conditions and results are show in FIG. 1, as Table 2.

EXAMPLE 4

The process is similar to Example 1 except that methanol is used for reaction with metallurgical silicon instead of ethanol. Methoxysilanes formed in the reaction mix with unreacted methanol. Experiment conditions and results are shown in FIG. 1, as Table 2.

From these examples and the above description of the invented technology, it is clear that the proposed method has several advantages over the precursor technique. Initially, it allows increasing purity of produced silane due to: (1) separation of unreacted dry alcohol from the products of silicon-alcohol reaction at or near room temperature and reusing alcohol in the process; (2) reusing the active part of a catalyst in simultaneous oxidation and reduction reaction of alcoxysilanes; (3) preliminary absorption purification of silane with cooled absorber followed by adsorption cleaning; and (4) return of dehydrated alcohol, resulting from complete hydrolysis of tetra-alcoxysilane subsequently purified, to react with silicon. Secondly, the method allows reduction of raw material consumption due to: (1) return of alcohol from all stages to the beginning of the process; (2) reuse of the active catalyst portions; and (3) increase in output of silane by reducing the amount of secondary products formed. In addition, the method provides lower energy consumption due to: (1) extracting unreacted alcohol from products of the reaction with silicon; (2) conducting simultaneous oxidation and reduction reaction in the presence of a catalyst in the continues regime at or near room temperature; and (3) introducing the step of preliminary silane purification by absorption. Finally, the technological process proposed generates no wastes (is wasteless) and is thus ecologically safe.

We claim:

1. A process for the preparation of silane, comprising the steps of:
   (a) forming an alcoxysilane product of a metallurgical silicon and alcohol reactant mixture, at an elevated temperature;
   (b) separating, and then purifying, the alcoxysilane product;
   (c) reducing and simultaneously oxidizing the purified alcoxysilane, in a second reaction mixture, at a temperature of between −20° C. and 40° C., and for a period of between 1 and 50 hours, in the presence of a catalyst, wherein products of the reaction mixture comprise a gaseous silane, and a liquid including an active portion of the catalyst, tetra-alcoxysilane, and an impurity compound having a silicon-hydrogen bond;
   (d) purifying the silane by an impurity adsorption;
   (e) mixing an alcohol and the liquid products of the simultaneous oxidation and reduction reaction;
   (f) extracting tetra-alcoxysilane from the alcohol and liquid products mixture; and
   (g) hydrolyzing the tetra-alcoxysilane wherein silica sol and alcohol are produced.

2. The process of claim 1, wherein mixing an alcohol and the liquid products of the simultaneous oxidation and reduction reaction is in an amount sufficient to assure an absence of reacting mass compounds having silicon-hydrogen bonds, and the active portion of the catalyst is recycled as a reactant back into the simultaneous oxidation and reduction step.

3. The process of claim 2, further comprising dehydrating the alcohol product of the tetra-alcoxysilane hydrolysis step, using the tetra-alcoxysilane extract of the liquid products, and then completely hydrolyzing the tetra-alcoxysilane.

4. The process of claim 1, wherein purifying the silane is by absorption in a counter-current flow, at a temperature near the freezing point of the absorption medium.

5. The process of claim 4, wherein absorption continues for approximately 5–60 minutes, at a silane and absorber temperature differential of not more than 5° C.

6. The process of claim 5, wherein the silane purification absorbant is the tetra-alcoxysilane liquid products extract of the simultaneous oxidation and reduction reaction.

* * * * *